(12) United States Patent
Qiu et al.

(10) Patent No.: US 8,189,492 B2
(45) Date of Patent: May 29, 2012

(54) ERROR RECOVERY IN AN AUDIO-VIDEO MULTIPOINT CONTROL COMPONENT

(75) Inventors: Jingyu Qiu, Issaquah, WA (US); Shiwei Wang, Bellevue, WA (US); Regis J. Crinon, Camas, WA (US); Guo-Wei Shieh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 178 days.

(21) Appl. No.: 12/406,114

(22) Filed: Mar. 18, 2009

(65) Prior Publication Data

US 2010/0238789 A1    Sep. 23, 2010

(51) Int. Cl.
H04J 1/16    (2006.01)
(52) U.S. Cl. ......... 370/252; 370/254; 370/300; 370/352
(58) Field of Classification Search ................. 370/216, 370/389, 392, 252, 254, 300, 352
See application file for complete search history.

(56) References Cited

U.S. PATENT DOCUMENTS

| | | | |
|---|---|---|---|
| 5,608,450 A * | 3/1997 | Agarwal et al. | 348/14.15 |
| 5,793,895 A * | 8/1998 | Chang et al. | 382/236 |
| 6,026,080 A | 2/2000 | Roy | |
| 6,205,140 B1 * | 3/2001 | Putzolu et al. | 370/389 |
| 6,480,546 B1 * | 11/2002 | Kim et al. | 375/240.27 |
| 6,661,430 B1 * | 12/2003 | Brewer et al. | 715/723 |
| 6,680,976 B1 * | 1/2004 | Chen et al. | 375/240.26 |
| 6,901,069 B2 * | 5/2005 | Bastin | 370/356 |
| 6,920,175 B2 * | 7/2005 | Karczewicz et al. | 375/240.03 |
| 7,412,531 B1 * | 8/2008 | Lango et al. | 709/231 |
| 7,693,220 B2 * | 4/2010 | Wang et al. | 375/240.2 |
| 7,752,325 B1 * | 7/2010 | Yadav et al. | 709/231 |
| 7,801,126 B2 * | 9/2010 | Blanton | 370/389 |
| 2004/0252761 A1 | 12/2004 | Brown et al. | |
| 2005/0013249 A1 * | 1/2005 | Kong et al. | 370/235 |

(Continued)

OTHER PUBLICATIONS

"Video Communication System-Technical Documentation: QoS", retrieved at <<http://www.spireglobal.com/files/docs/SONY_Whitepaper-QoS.pdf>>, Sony Corporation, Version 1.0, May 2006.

(Continued)

*Primary Examiner* — Ricky Ngo
*Assistant Examiner* — Dewanda Samuel

(57) ABSTRACT

Architecture for enabling a communications endpoint to quickly recover from a packet loss, reducing duration of a signal dropout. A communications component sends a downlink of dependency-structured signals, such as audio and/or video signals using compressed frames between key frames. A multipoint control component (MCC) is located between the communications component and multiple endpoints, and distributes the downlink to the multiple endpoints. A frame caching component caches a key frame of the downlink. If a key frame is lost at one of the endpoints, the endpoint sends a packet loss report to the frame caching component. The key frame is resent from the frame caching component to the endpoint in response to the key frame loss. In this way, the frame caching component can respond to specific frame loss situations on any of the endpoints, without interfering with the performance on the other endpoints.

11 Claims, 14 Drawing Sheets

U.S. PATENT DOCUMENTS

| | | | |
|---|---|---|---|
| 2006/0087687 A1* | 4/2006 | Eom | 358/1.15 |
| 2006/0184684 A1* | 8/2006 | Weiss et al. | 709/231 |
| 2007/0124626 A1* | 5/2007 | Lee et al. | 714/704 |
| 2008/0062990 A1* | 3/2008 | Oran | 370/392 |
| 2008/0137728 A1* | 6/2008 | Van Der Stok et al. | 375/240.01 |
| 2008/0225735 A1 | 9/2008 | Qiu et al. | |
| 2008/0239062 A1 | 10/2008 | Civanlar et al. | |
| 2008/0263616 A1* | 10/2008 | Sallinen et al. | 725/131 |

OTHER PUBLICATIONS

"Ensuring Scalability for your Video Network: Selecting a Multipoint Control Unit", retrieved at <<http://www.ivci.com/pdf/videoconferencing_tandberg_selecting_a_multipoint_control_unit.pdf>>, Tandberg White Paper, Jul. 2005.

Feamster, et al., "Packet Loss Recovery for Streaming Video", retrieved at <<http://nms.csail.mit.edu/papers/pv2002.pdf>>, 12th International Packetvideo Workshop (PV 2002), Apr. 24-26, 2002.

Gharavi, et al., "RTCP-based Frame-Synchronized Feedback Control for IP-Video Communications over Multipath Fading Channels", retrieved at http://ieeexplore.ieee.org/stamp/stamp.jsp?arnumber=1312763&isnumber=29120>>, IEEE International Conference on Communications, 2004, vol. 3, Jun. 20-24, 2004, pp. 1512-1516.

\* cited by examiner (A) LOSS OF P-FRAME (B) SKIP TILL NEXT SP FRAME (C) SUBSEQUENT SP-FRAME

ERROR RECOVERY IN AN AUDIO-VIDEO MULTIPOINT CONTROL COMPONENT

BACKGROUND

Video compression is obtained by creating dependencies in-between frames. In a portion of video, successive frames are typically very similar, and only different in minor respects. These differences represent the delta change from frame to frame. To compress a temporal interval of video, the delta change is encoded for a succession of frames rather than sending full frames. In this way, the static elements (e.g., backgrounds) found in successive frames are not stored over and over for each frame, which saves space and reduces the quantity of data for that interval.

In video compression schemes, an intra-coded frame or I-frame is a conventional, full-sized frame that stores an entire picture. A predictive frame or P-frame represents an encoded frame that only includes the delta change data from the previous frame, which can be an I-frame or another P-frame. A bi-predictive frame or B-frame is inserted in-between I-frames and P-frames and encodes changes from the frames before and after, thus allowing greater compression than obtainable with P-frames. However, problems can result from the inter-frame dependencies in-between the compressed frames. If a frame is dropped due to a network packet loss, the dropped frame impacts the following frames until the next I-frame is received.

Packet loss is especially a challenge for Internet real-time video transmissions sent to multiple endpoints. A previous type of error recovery implementation can be used to resend a recovery frame to a single endpoint in the event of packet loss. However, this solution is not effective with real-time audio-visual multipoint communications to multiple endpoint recipients. For a multiple endpoint system, packet loss reports from each recipient are aggregated and the same recovery frames are sent to each endpoint. Though this can be effective for small systems with four endpoints, for example, for large systems of about one hundred endpoints, sending recovery frames into the pipeline results in greater congestion and packet loss. This lack of error recovery can result in a video drop out of up to ten seconds.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, architecture is disclosed for error recovery from network packet loss on an audio-visual downlink to multiple endpoint recipients. In this way, the duration of corrupted video is reduced, which increases the perceived video quality to the end user.

The error recovery architecture includes a communications component that sends a downlink to one or more endpoints. The downlink includes dependency-structured compressed signals in which frames depend from one or more previous frames in the downlink. The dependency-structured compressed signals can be compressed audio-video signals sent to multiple endpoint recipients, for example. A frame caching component caches a key frame of the downlink. The key frame is resent in the event that one of the endpoints sends a packet loss report indicating the loss of a key frame loss.

The error recovery architecture determines a suitable response to a packet loss report based on the type of lost frames. In the event of a loss of an I-frame or other key frame, the key frame is resent and non-key frame delivery is terminated. In the event of a lost P-frame, frame delivery is terminated until the next key frame is received. If a B-frame is lost, resending of any frames is prevented, and effectively, nothing is done. The key frames can be an I-frame or a super-predictive frame, as will be explained in detail hereinbelow.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
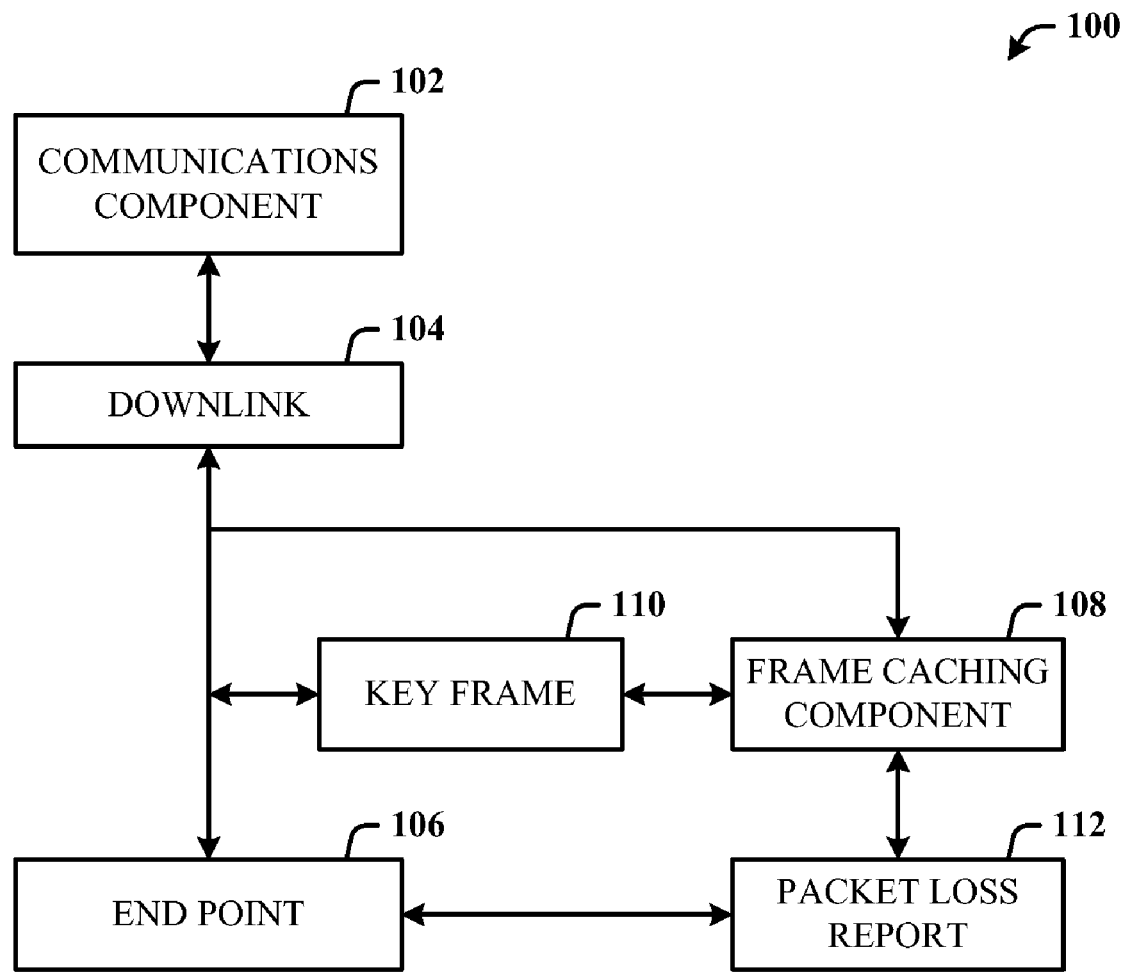
FIG. 1 illustrates a computer-implemented system for performing error recovery.

The disclosed error recovery architecture enables a communications endpoint to quickly recover from a packet loss, reducing duration of a signal dropout. Additionally, multiple endpoints can quickly recover from respective particular packet losses without impinging on the performance of other endpoints. A communications component sends a downlink of dependency-structured compressed signals. The downlink can be a stream of compressed P-frames and B-frames in-between full key frames such as I-frames, for example. The downlink can further be an audio and/or video signal, for example. A multipoint control unit (MCU) is located between the communications component and multiple endpoints, and distributes the downlink to the multiple receiving endpoints.

A frame caching component caches a key frame sent from the downlink. If a key frame is lost at one of the endpoints, the endpoint sends a packet loss report to the frame caching component. The key frame is resent from the frame caching component to the endpoint in response to the key frame loss. In this way, the frame caching component can respond to specific frame loss situations on any of the endpoints, without interfering with the performance on the other endpoints. The frame caching component is located on the MCU, downstream from the communications component, thus establishing a shorter signal distance to the endpoints and enabling the endpoints to quickly recover.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 for performing error recovery. The system 100 can be used for error recovery with point-to-point (P2P) communications from a sender to a single endpoint recipient. The system 100 can also be used for error recovery in a multipoint transmission from a sender to multiple endpoint recipients.

As illustrated in FIG. 1, the system 100 includes a communications component 102 for sending a downlink 104 of dependency-structured compressed signals to an endpoint 106. A frame caching component 108 caches a key frame 110 of the downlink 104. The frame caching component 108 resends the key frame 110 in response to a key frame loss indicated in a packet loss report 112 received from the endpoint 106.

The dependency-structured compressed signals can include audio and/or video signals, for example. The dependency-structured frames can include key frames which can be intra-coded frames (I-frames) that are conventional, full-sized frames representing a complete image of the frame. Between the key frames are predictive frames (P-frames) that encode the delta change data from the previous frame. For example, a first P-frame in a sequence depends on the I-frame, and the second P-frame depends on the first P-frame, the third P-frame depends on the second P-frame, and so on. Bi-predictive frames (B-frames) can also be used that encode changes from the key frames and P-frames frames before and after, so as to only incorporate the specific changes between these frames.

As used herein, a key frame can be an intra-coded frame (I-frame) as described hereinabove, or alternatively, a super-predictive frame (SP-frame). An SP-frame does not depend on the immediately previous frame, as does a conventional P-frame, but is dependent on the previous key frame in a sequence, which can be either an I-frame or another SP-frame. In this manner, an SP-frame captures a delta change difference from the previous key frame, thus, not requiring a rigid dependency structure, and enabling shorter packet dropouts and quicker error recovery.

Figure 2:
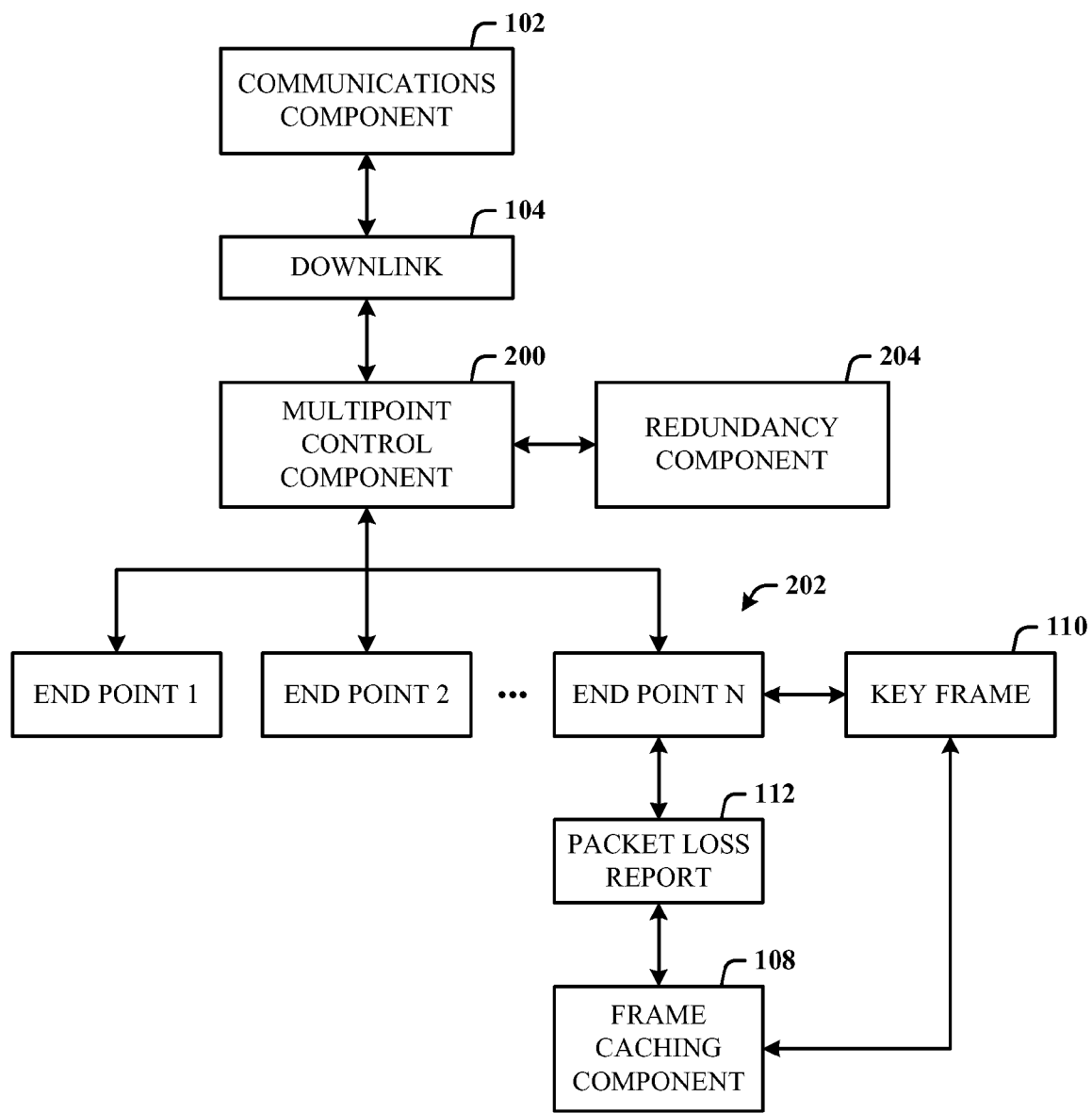
FIG. 2 illustrates additional aspects of the computer-implemented system for performing error recovery.

FIG. 2 illustrates additional aspects of the computer-implemented system 100 for performing error recovery. A multipoint control component (MCC) 200 (e.g., an MCU) receives the downlink 104 from the communications component 102. The MCC 200 sends the downlink 104 to multiple endpoints 202. Key frame loss can be indicated for one or more of the endpoints 202 that can each send the respective packet loss report 112. In this event, the frame caching component 108 resends the key frame 110 to the respective one(s) of the endpoints 202. In this way, each of the endpoints 202 can recover from any specific individual packet losses, without impacting the performance of any of the other endpoints 202.

During operation, the MCC 200, upon receiving a request to resend a frame, can optionally decide whether or not to resend the frame. For example, a delay between issuance of the request from the endpoint 202 and reception by the MCC 200 can be large and the MCC 200 can already have just sent a new I-frame or SP-frame, or alternatively, be just about ready to send a new I-frame or SP-frame at the time the resent request is received. In this case, the MCC 200 does not send a cached frame since a more recent one is being sent or is about to be sent.

Likewise, upon receiving a request for resending the frame, the MCC 200 can optionally increase the amount of redundancy (e.g., via forward error correction (FEC)) for that frame to increase the probability that that the frame will not be lost again. To that end, as illustrated in FIG. 2, the MCC 200 cooperates with a redundancy component 204 for optionally controlling redundancy (e.g., the number of FEC packets) associated with the frame resent to one of the receiving endpoints 202. In the manner, the MCC 200 can base a redundancy decision on network statistics (e.g., packet loss reports) received from the endpoints 202 and/or the frequency of retransmission requests from one of the receiving endpoints 202.

Figure 3:
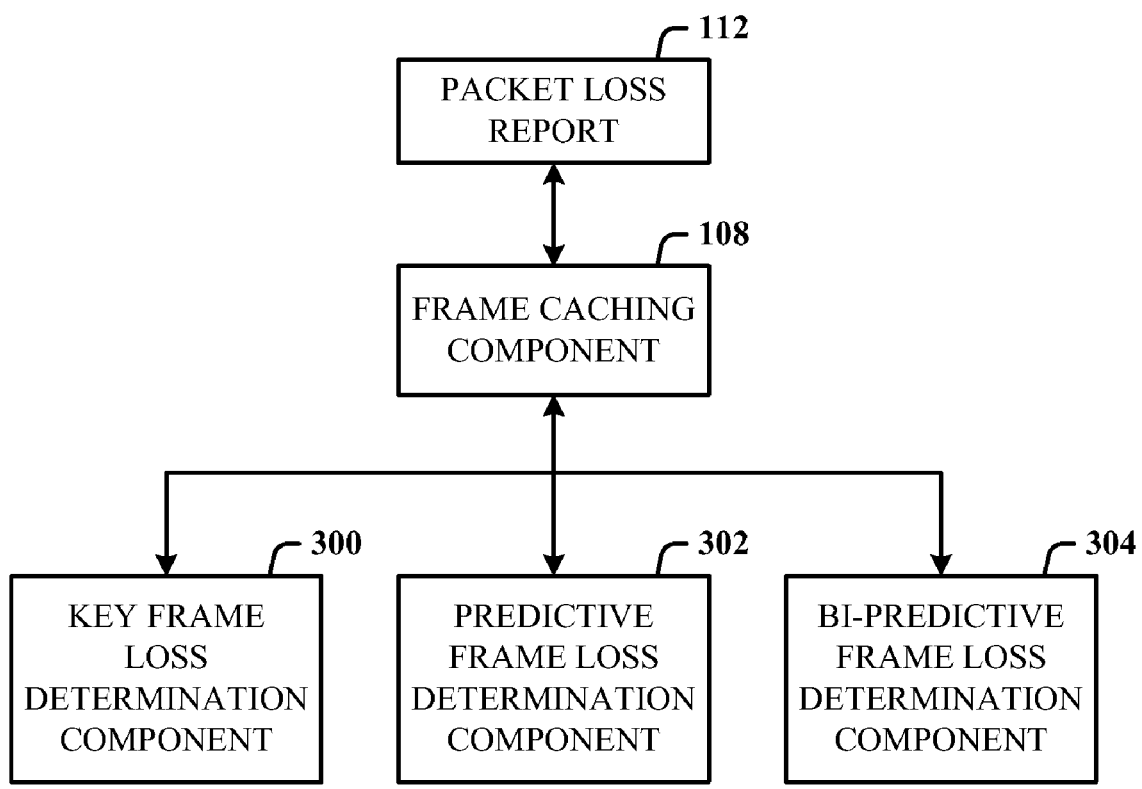
FIG. 3 illustrates determination components for responding to different frame loss scenarios.

FIG. 3 illustrates determination components for responding to different frame loss scenarios. The determination components can cooperate with the frame caching component 108 or can be subcomponents within the frame caching component 108. Each of the determination components implements an action that is performed for the duration of a key frame cycle, until a following subsequent key frame is received, beginning a new key frame cycle in which normal frame sending resumes.

As illustrated in FIG. 3, a key frame loss determination component 300 responds to a key frame loss indicated in the packet loss report 112 by resending the key frame and terminating non-key frame delivery. A predictive frame loss determination component 302 responds to a predictive frame loss indicated in the packet loss report 112 and terminates frame delivery until a following sequential key frame is sent. A bi-predictive frame determination component 304 prevents resending of any frames in response to a bi-predictive frame loss indicated in the packet loss report 112.

Figure 4:
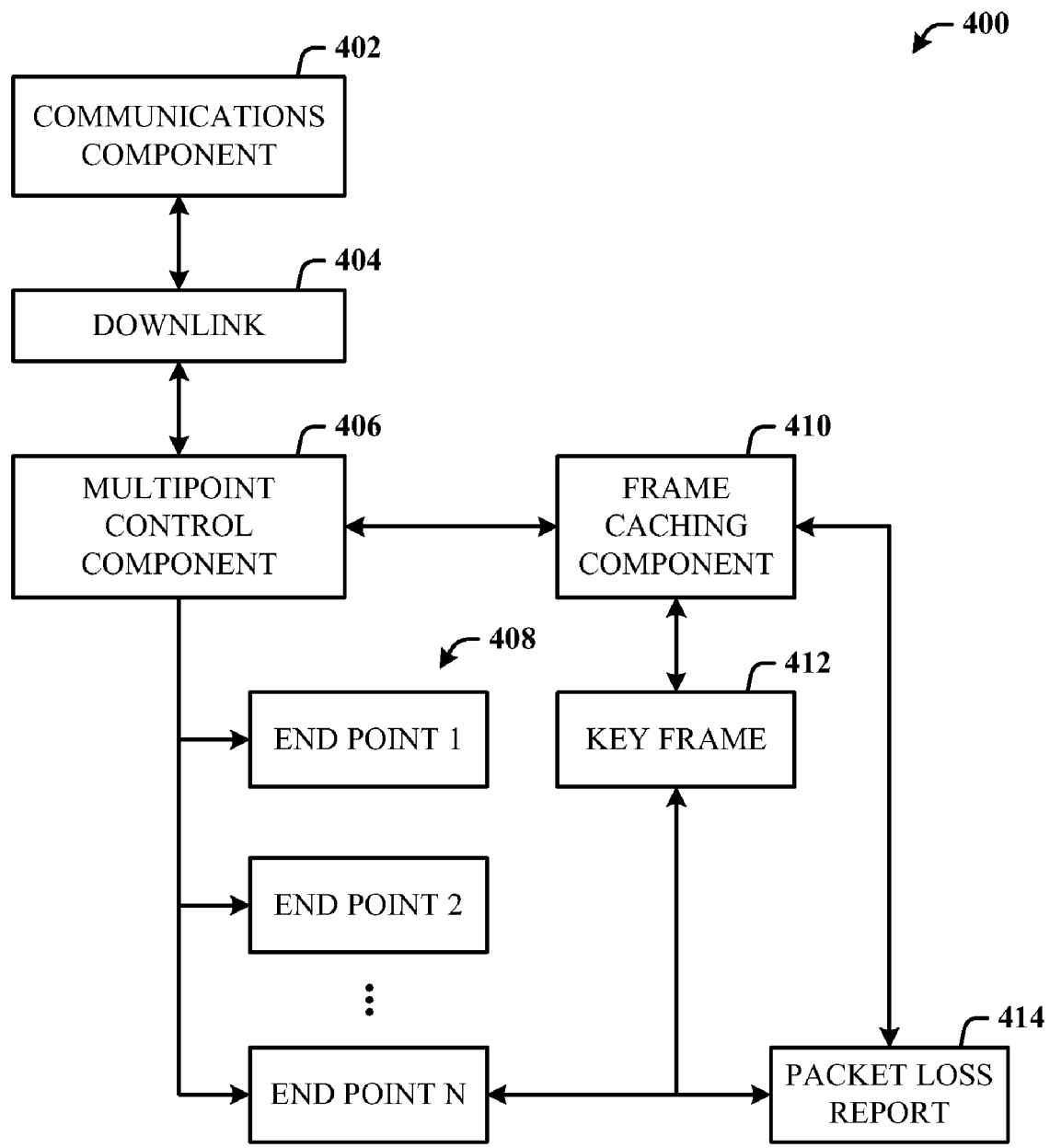
FIG. 4 illustrates an alternative embodiment of a computer-implemented system for performing error recovery.

FIG. 4 illustrates an alternative embodiment of a computer-implemented system 400 for performing error recovery. A communications component 402 sends a downlink 404 of dependency-structured compressed video signals. As mentioned hereinabove, these signals can be audio and/or video signals, and be composed of key frames (I-frames and SP-frames) and dependent frames (P-frames and B-frames).

As illustrated in FIG. 4, an MCC 406 is located between the communications component 402 and multiple endpoints 408. The MCC 406 distributes the downlink 404 to the multiple endpoints 408. The MCC 406 is located downstream of the communications component 402 to allow a shorter path to the endpoints 408, for enabling quicker error recovery.

As also illustrated in FIG. 4, a frame caching component 410 is located on the MCC 406 for caching a key frame 412 of the downlink 404. In the event of a packet loss on one or more of the multiple endpoints 408, resulting in a dropped frame, the respective endpoint(s) 408 sends a packet loss report 414, which is received from the respective endpoint(s) 408 at the frame caching component 410. The frame caching component 410 resends the key frame 412 to the respective end-point(s) 408 in response to a key frame loss indicated in the packet loss report 414.

As mentioned in a previous embodiment indicated hereinabove, the MCC 406 can optionally determine to not to resend (e.g., in the event of high latency return trip time in receiving the request from the receiving end-point). In this way, the frame caching component 410 responds to each particular frame loss on each endpoint to provide error recovery specific to each endpoint and not interfere with the signal stream of the other endpoints. The MCC 406 can also track the frequency at which a request arrives from specific endpoints and adjust amount of data redundancy (e.g., FEC) in the frame that it resends.

Figure 5:
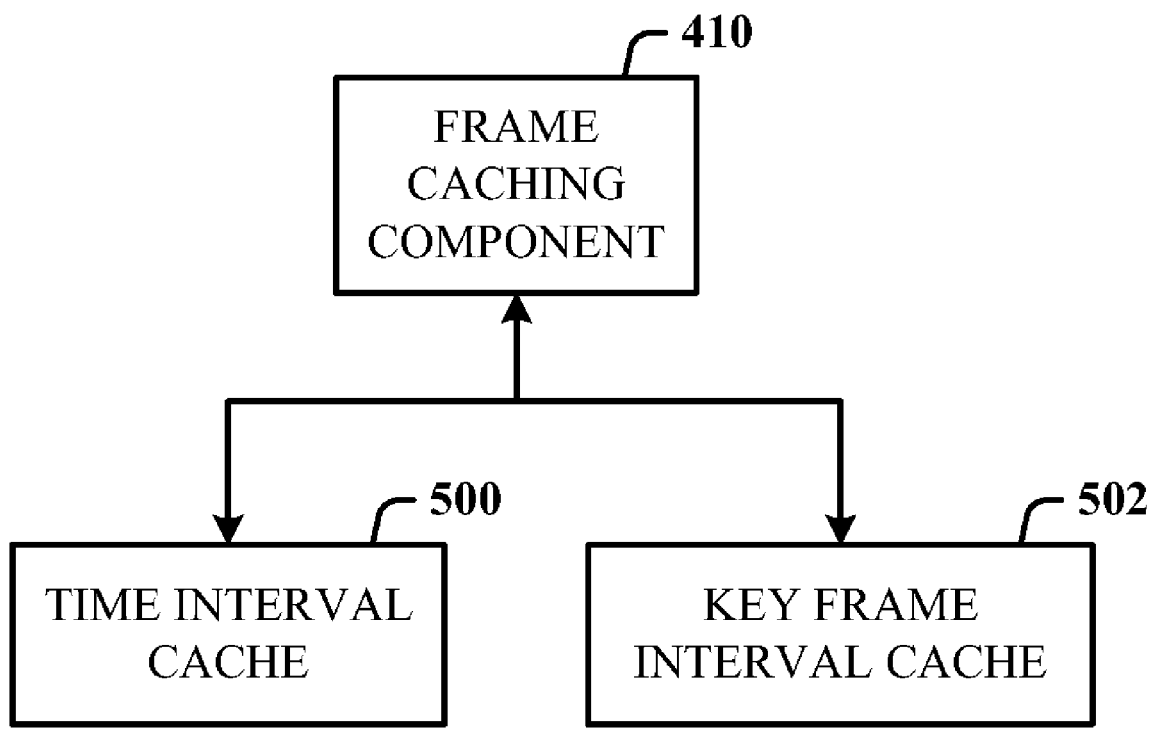
FIG. 5 illustrates types of caches used with a frame caching component.

FIG. 5 illustrates types of caches used with a frame caching component 410. A time interval cache 500 can be used for retaining a time interval of frames between sequential key frames. The time interval cache can be one second, for example. A key frame interval cache 502 can be used for retaining a key frame and subsequent frames prior to a following sequential key frame. Thus, a certain number of frames can be retained, irrespective of a time interval. In these ways, a full key frame cycle can be stored and resent in the event of a packet loss, so the recovery period can be significantly reduced, thus increasing system performance.

The caches (500 and 502) disclosed in FIG. 5 can be included in an extended embodiment for increasing the number of stored frames to store up to a one second interval of frames. In this manner, if a lost P-frame or SP-frame is detected, the detected frame and all frames following can be resent. Upon receiving a new SP-frame at the audio/video MCU (AVMCU) from the upper link, the resending of the remaining stored frames is skipped. The video then jumps to the new SP-frame, and the video stream behaves normally thereafter.

The disclosed embodiments can be applied to one-to-many mesh video streaming as described in detail hereinbelow, and can also be extended to a many-to-many mesh video. It is to be appreciated that the disclosed embodiments can be configured for any video scenarios in which frames are encoded once and sent multiple times in a real-time or near real-time manner.

Figure 6:
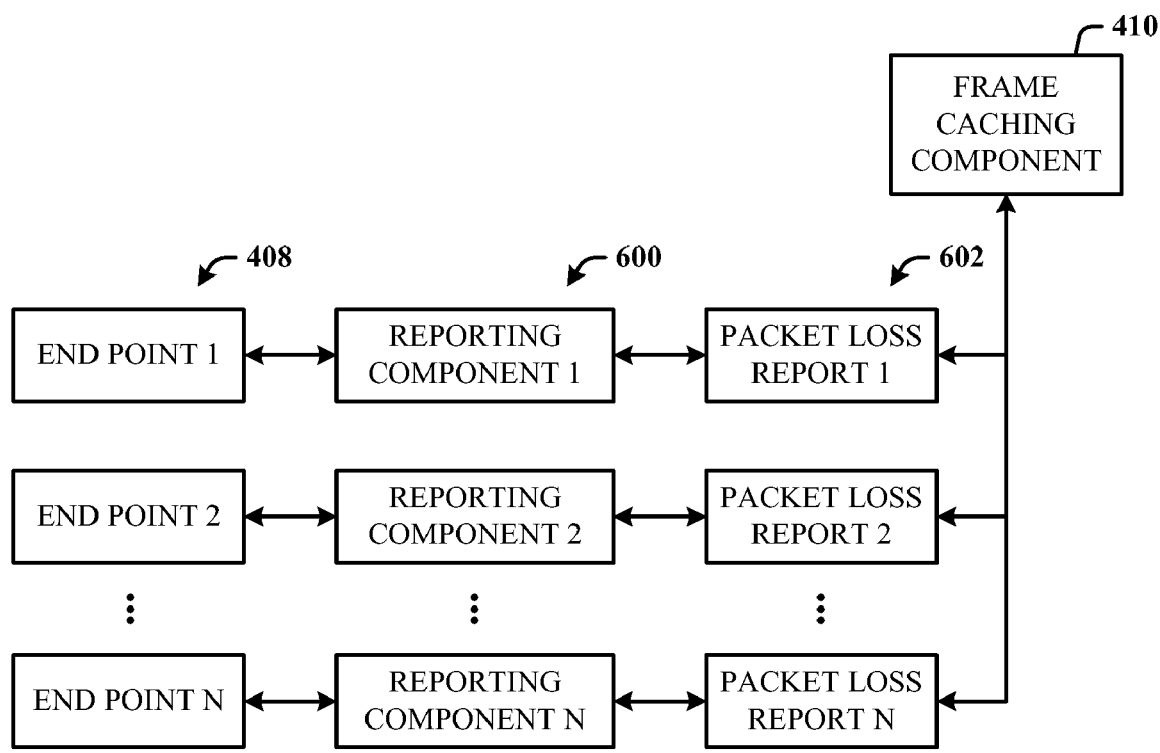
FIG. 6 illustrates reporting components used with multiple endpoints for generating respective packet loss reports.

FIG. 6 illustrates reporting components 600 used with the multiple endpoints 408 for generating respective packet loss reports 602. Each of the multiple endpoints 408 can cooperate with the respective reporting components 600 for sending respective packet loss reports 602 to the frame caching component 410. Each of the packet loss reports 602 can indicate a key frame loss, a predictive frame loss, and/or a bi-predictive frame loss. In this manner, the individualized packet loss reports 602 can be generated for each endpoint 408, enabling the frame caching component 410 to execute a specific error recovery for each endpoint 408.

Figure 7:
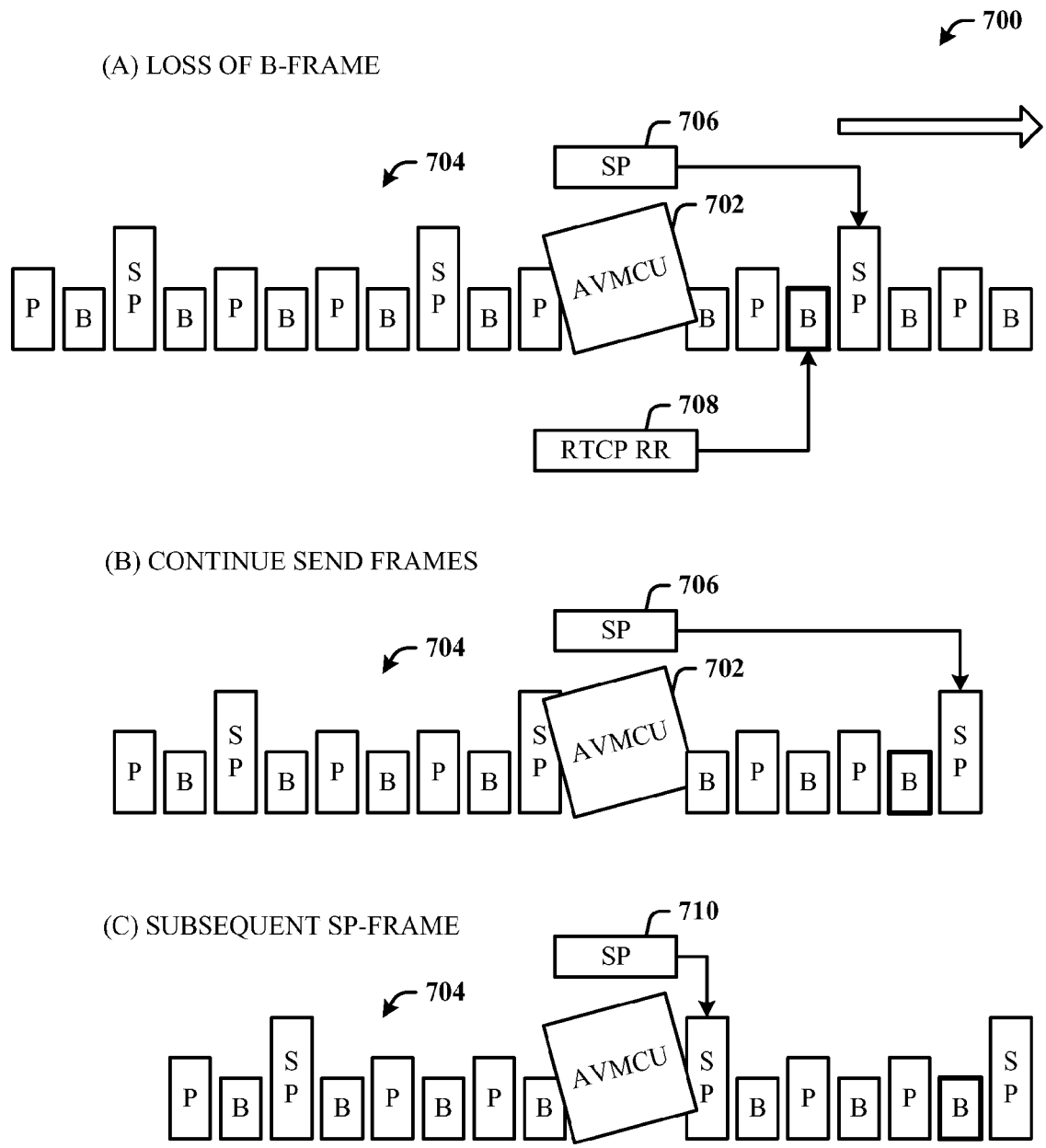
FIG. 7 illustrates a process flow for error recovery following loss of a B-frame.
Figure 8:
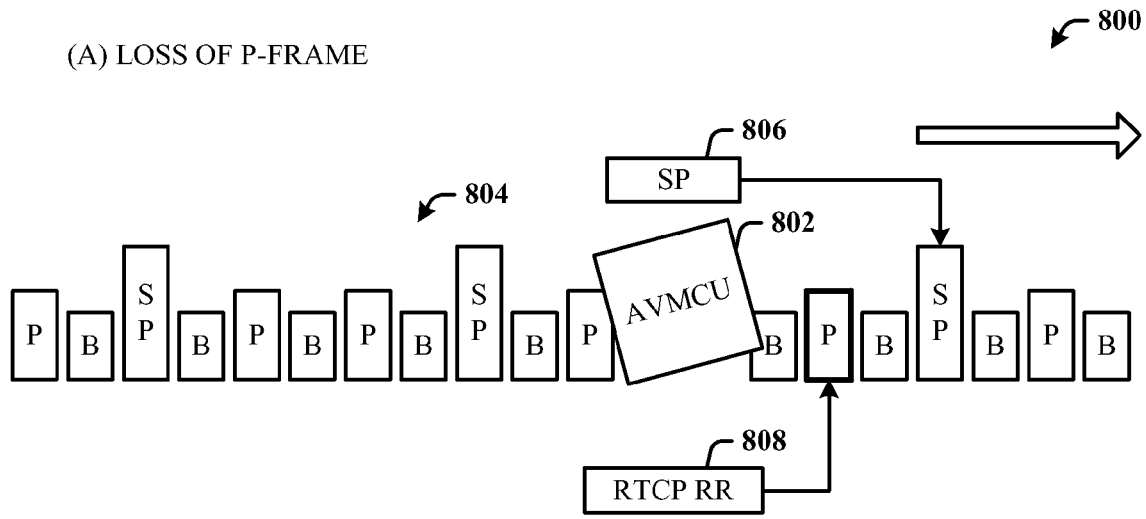
FIG. 8 illustrates a process flow for error recovery following loss of a P-frame.
Figure 8:
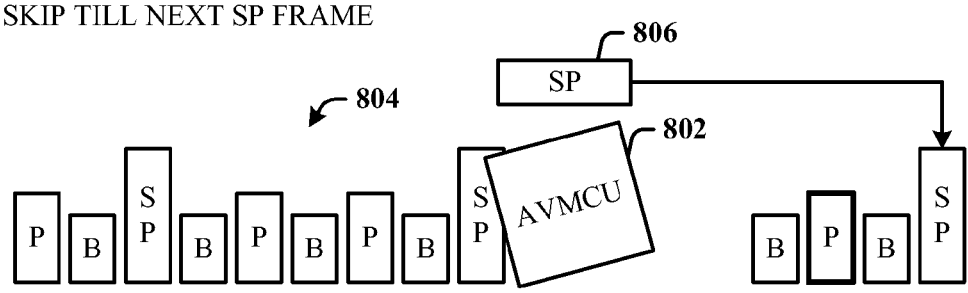
Figure 8:
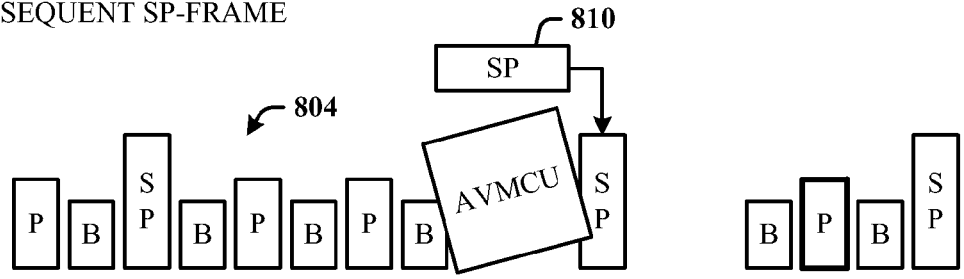
Figure 9:
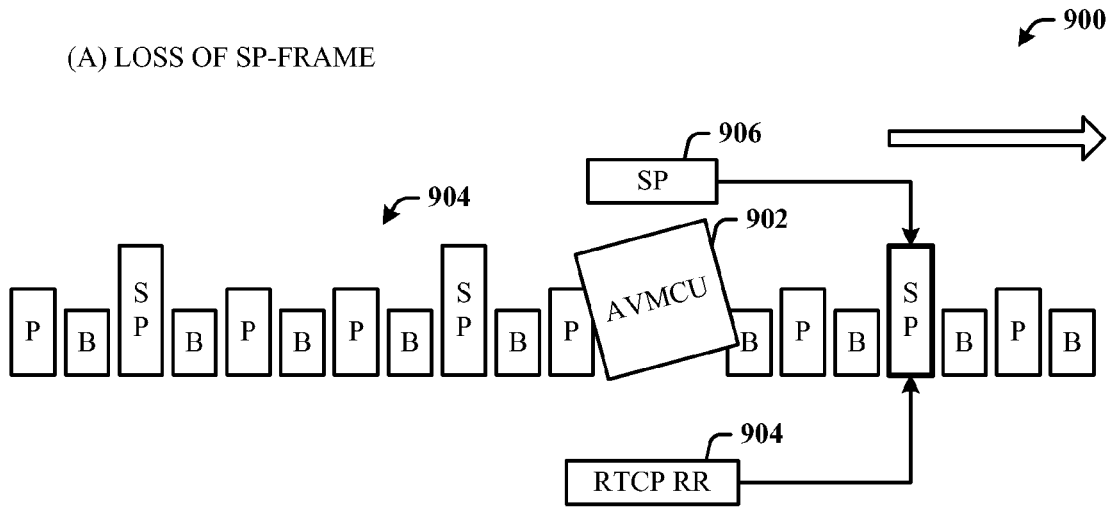
FIG. 9 illustrates a process flow for error recovery following loss of an SP-frame.
Figure 9:
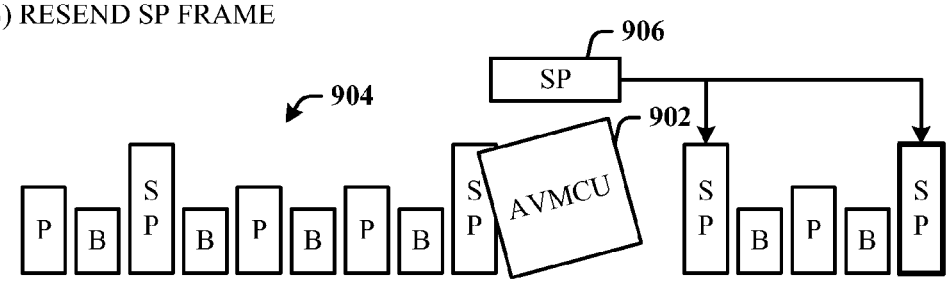
Figure 9:
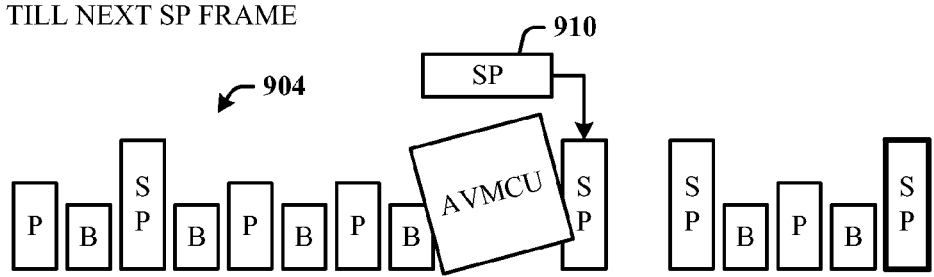

Process flows for the herein disclosed embodiments are illustrated in FIG. 7, FIG. 8, and FIG. 9 in which the frame caching component can be a component of an AVMCU that stores latest key frame (SP-frame or I-frame). Error recovery is performed when a receiving endpoint sends a packet loss report to the AVMCU indicating receipt of a corrupted image frame (a frame with lost packets). The AVMCU sends the latest key frame to that endpoint, and the corrupt frames that follow the corrupted image are cleared away.

In this fashion, the corrupted image only lasts for the duration of a round-trip delay time (RTT), typically 200 milliseconds across the North American continent. This enables the endpoint to quickly recover from packet loss and reduce duration of corrupted video down to about one second, for example, a significant improvement over the 10-second drop exhibited in previous systems. Thus, the penalty to "healthy" endpoints is avoided, since only the downlink with packet loss needs a resent frame. Additionally, only key frames are resent, not a series of frames, this avoiding additional network congestion in the event of packet loss.

FIG. 7 illustrates a process flow 700 for error recovery following loss of a B-frame. An AVMCU 702 receives a downlink 704 of frames from a sender and transmits the frames to multiple receiving endpoints. An SP-frame 706 is the first frame in a sequence of dependent frames. At (A), a packet loss report 708 is received at the AVMCU 702 indicating the loss of the B-frame. The packet loss report 708 can be a real-time communications protocol receiver report (RTCP RR). The packet loss report 708 can be in accordance with real-time transport protocol (RTP) or secure real-time transport protocol (SRTP). However, the packet loss report 708 can also be of any other suitable format or protocol. At (B), the AVMCU 702 does nothing and continues to send frames, since the B-frames are not part of the dependency structure of subsequent frames, and therefore, the subsequent frames are not affected by the loss of a B-frame. At (C), the subsequent SP-frame 710 is received and the next key frame cycle commences.

FIG. 8 illustrates a process flow 800 for error recovery following loss of a P-frame. An AVMCU 802 receives a downlink 804 of frames from the sender and transmits the frames to the multiple receiving endpoints. An SP-frame 806 is the first frame in a sequence of dependent frames. At (A), a packet loss report 808 is received at the AVMCU 802 indicating the loss of a P-frame. At (B), the AVMCU 802 skips the sending of frames until the following subsequent key frame, since the frames that follow depend on the lost P-frame and are corrupt. At (C), the subsequent SP-frame 810 is received and sending is resumed, resulting in a video drop of about a half-second.

FIG. 9 illustrates a process flow 900 for error recovery following loss of a SP-frame. An AVMCU 902 receives a downlink 904 of frames from the sender and transmits the frames to the multiple receiving endpoints, beginning with an SP-frame 906 as the first frame in a sequence of dependent frames. At (A), a packet loss report 908 is received at the AVMCU 902 indicating the loss of the SP-frame 906. At (B), the AVMCU 902 resends the cached SP-frame 906 and skips the subsequent dependent P-frames. During the RTT for receiving the error report 908, a number of P-frames have already been sent, and these frames are corrupt for following the lost SP-frame 906. Resending the lost SP-frame 906 enables a static image to be displayed during the skipped dependent frames. At (C), a subsequent SP-frame 910 is received, and sending is resumed. In this manner, a one second drop occurs on a particular endpoint without burdening to the other endpoints.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
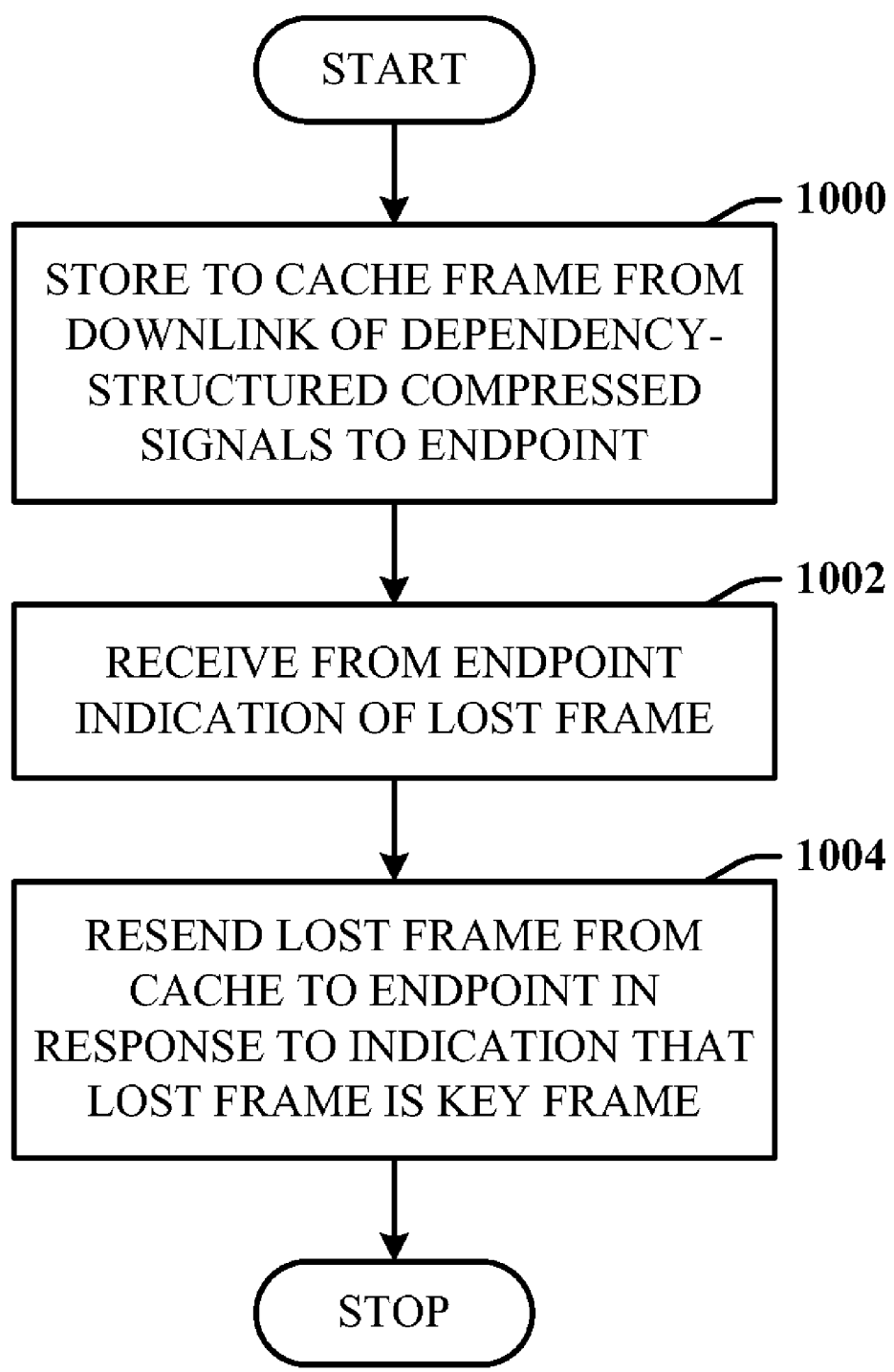
FIG. 10 illustrates a method of error recovery.

FIG. 10 illustrates a method of error recovery. At 1000, one or more frames from a downlink of dependency-structured compressed signals to an endpoint are stored to a cache. At 1002, an indication of a lost frame is received from the endpoint. At 1004, the lost frame from the cache is resent to the endpoint in response to an indication that the lost frame is a key frame. The dependency-structured compressed signals can be audio signals and/or video signals, and can include dependent frames that encode delta change differences from previous frames in a sequence. In this way, the endpoint can quickly recover from an error without affecting the performance of any other endpoints that can be receiving the downlink.

Figure 11:
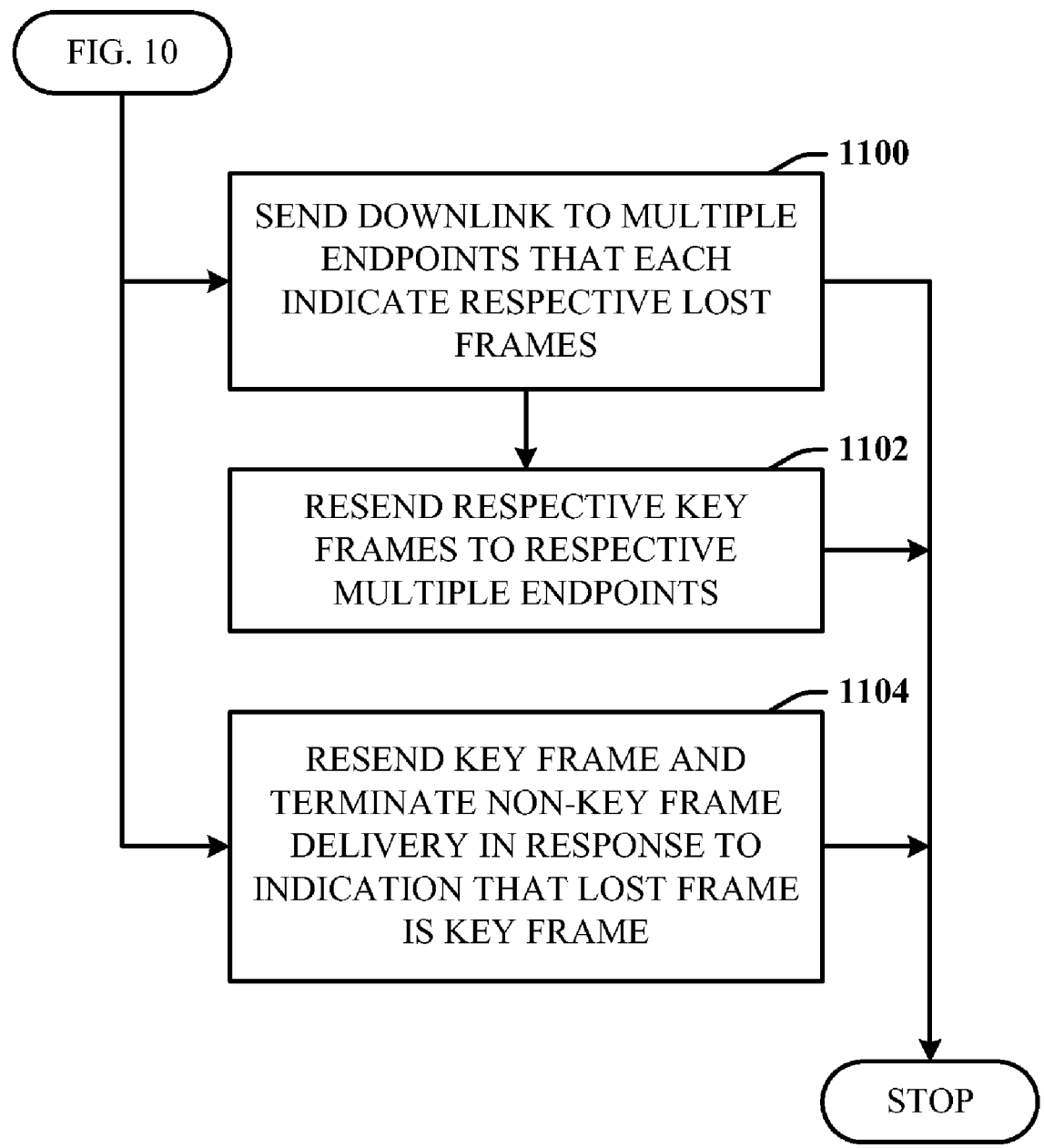
FIG. 11 illustrates further aspects in the method of error recovery.

FIG. 11 illustrates further aspects in the method of error recovery. At 1100, the downlink is sent to multiple endpoints that each indicate respective lost frames. At 1102, the respective key frames are resent to respective multiple endpoints. At 1104, the key frame is resent and non-key frame delivery is terminated in response to the indication that the lost frame is a key frame.

Figure 12:
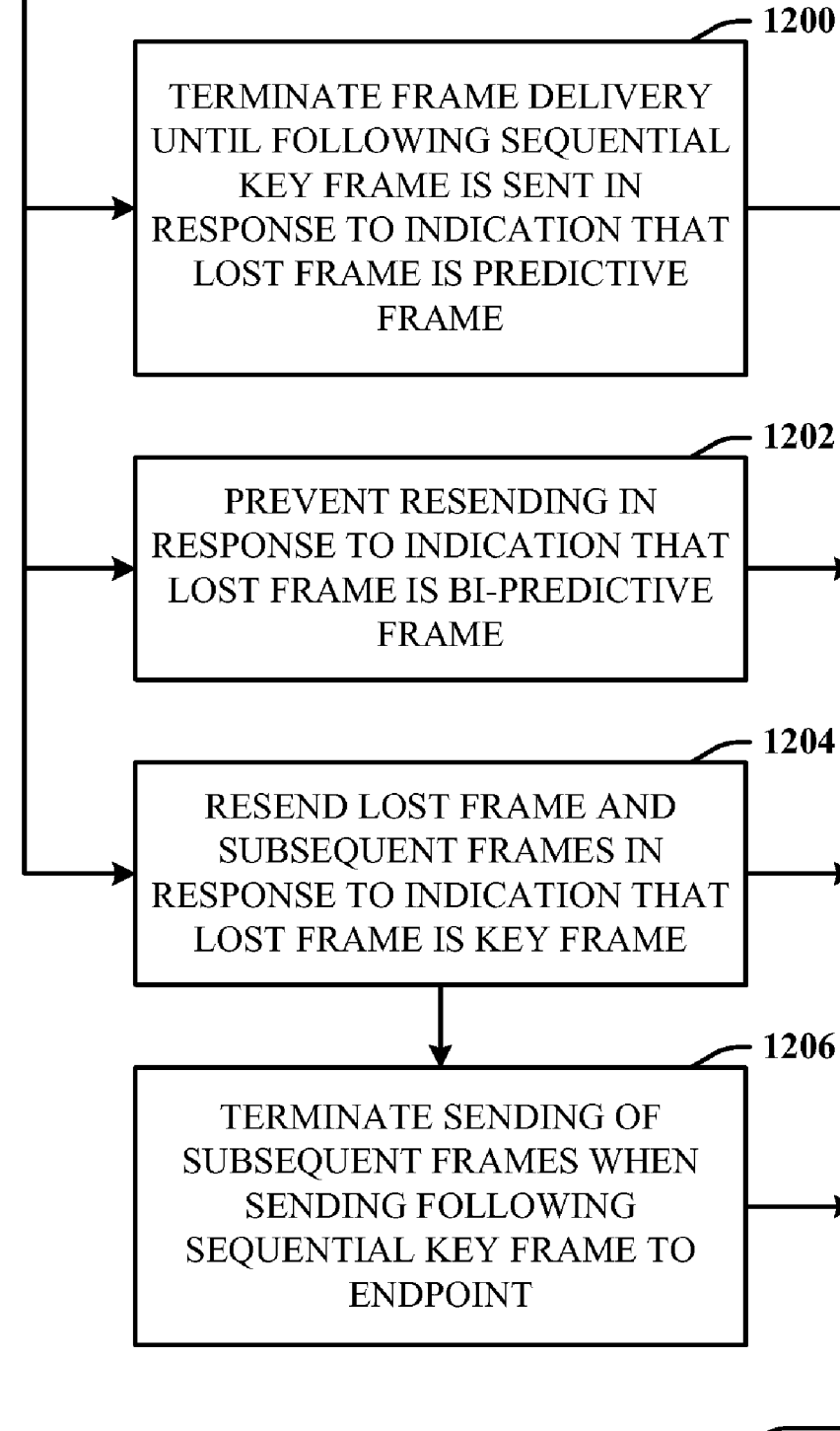
FIG. 12 illustrates additional aspects in the method of error recovery.

FIG. 12 illustrates additional aspects in the method of error recovery. At 1200, frame delivery is terminated until a following sequential key frame is sent in response to the indication that the lost frame is a predictive frame. At 1202, resending is prevented in response to the indication that the lost frame is a bi-predictive frame. At 1204, the lost frame and subsequent frames are resent in response to the indication that the lost frame is a key frame. At 1206, sending of the subsequent frames is terminated when sending a following sequential key frame to the endpoint.

The disclosed embodiments can also be implemented in a mesh network, where network nodes can be connected to other network nodes for sending messages from node to node. Specifically, the disclosed embodiments can be used with live webcam conferencing in which a one-to-many mesh network sends video to multiple client endpoints, as mentioned hereinabove. In this implementation, any network protection features are turned off. Responses are given to each RTCP packet loss report, which can be sent about once per second. The packet loss reports are buffered and each lost packet is calculated to determine the type of frame to resend in a response. If the packet loss report indicates a lost SP-frame, nothing is done but wait for next periodic SP-frame. If an I-frame resend is indicated, the I-frame is resent at intervals of up to once per second. For a lost packet resent to complete a current frame, all following frames are skipped until the next I-frame or SP-frame. Each key frame (SP-frame or I-frame) is buffered up. If a key frame is lost, the key frame is resent and the system waits for next key frame. If a P-frame is lost, sending is stopped until the next SP-frame. If a B frame is lost, the system does nothing and takes no action.

The disclosed embodiments can also be extended to an H.264 codec (a standard for video compression) for use in different frameworks. Additionally, the disclosed embodiments can be incorporated into a scalable, hierarchical codec in which the codec is not broken into temporal dependencies as described hereinabove, but also into spatial dependencies and according to signal-to-noise ratio (SNR). In this codec, a base layer provides a quarter of high definition video and an additional layer provides more spatial detail.

In addition to the aforementioned discussion, the disclosed embodiments can also be incorporated into a protocol between a client and the server, particularly for client endpoints running third party applications. In this way, error recovery can be extended to endpoint clients on different networks operating different hardware and software modules operating in accordance with a common error recovery protocol, as described hereinabove.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 13:
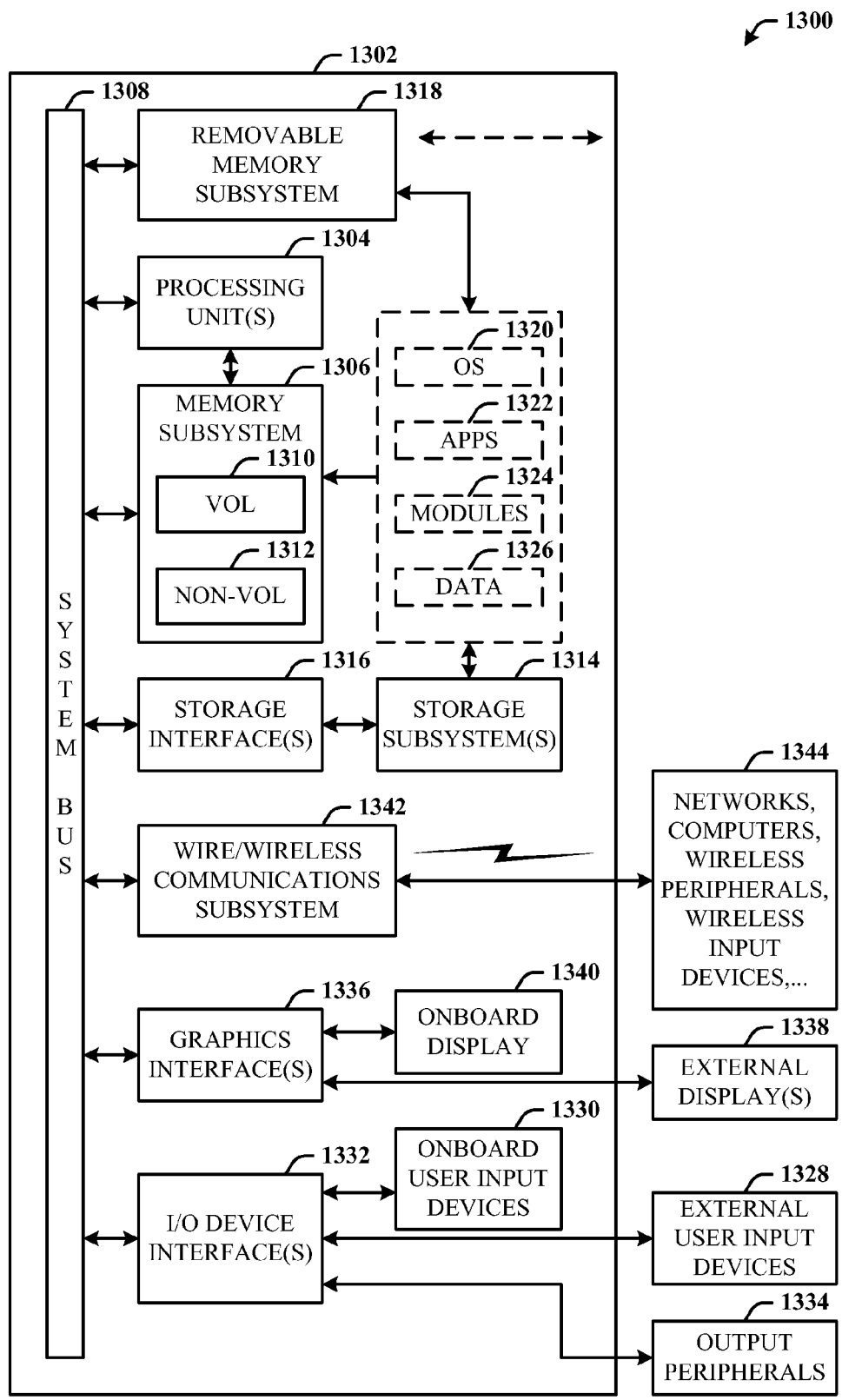
FIG. 13 illustrates a block diagram of a computing system operable to execute the error recovery in accordance with the disclosed architecture.

Referring now to FIG. 13, there is illustrated a block diagram of a computing system 1300 operable to execute error recovery in accordance with the disclosed architecture. In order to provide additional context for various aspects thereof, FIG. 13 and the following discussion are intended to provide a brief, general description of the suitable computing system 1300 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1300 for implementing various aspects includes the computer 1302 having processing unit(s) 1304, a system memory 1306, and a system bus 1308. The processing unit(s) 1304 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1306 can include volatile (VOL) memory 1310 (e.g., random access memory (RAM)) and non-volatile memory (NON-VOL) 1312 (e.g., ROM, EPROM, EEPROM, etc.). A basic input/output system (BIOS) can be stored in the non-volatile memory 1312, and includes the basic routines that facilitate the communication of data and signals between components within the computer 1302, such as during startup. The volatile memory 1310 can also include a high-speed RAM such as static RAM for caching data.

The system bus 1308 provides an interface for system components including, but not limited to, the memory subsystem 1306 to the processing unit(s) 1304. The system bus 1308 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1302 further includes storage subsystem(s) 1314 and storage interface(s) 1316 for interfacing the storage subsystem(s) 1314 to the system bus 1308 and other desired computer components. The storage subsystem(s) 1314 can include one or more of a hard disk drive (HDD), a magnetic floppy disk drive (FDD), and/or optical disk storage drive (e.g., a CD-ROM drive DVD drive), for example. The storage interface(s) 1316 can include interface technologies such as EIDE, ATA, SATA, and IEEE 1394, for example.

One or more programs and data can be stored in the memory subsystem 1306, a removable memory subsystem 1318 (e.g., flash drive form factor technology), and/or the storage subsystem(s) 1314, including an operating system 1320, one or more application programs 1322, other program modules 1324, and program data 1326. Generally, programs include routines, methods, data structures, other software components, etc., that perform particular tasks or implement particular abstract data types. All or portions of the operating system 1320, applications 1322, modules 1324, and/or data 1326 can also be cached in memory such as the volatile memory 1310, for example. It is to be appreciated that the disclosed architecture can be implemented with various commercially available operating systems or combinations of operating systems (e.g., as virtual machines).

The aforementioned application programs 1322, program modules 1324, and program data 1326 can include the computer-implemented error recovery system 100, the communications component 102, the downlink 104, the endpoint 106, the frame caching component 108, the key frame 110, and the packet loss report 112 of FIG. 1, the multipoint control unit 200, the multiple endpoints 202, and the redundancy component 204 of FIG. 2, the key frame loss determination component 300, the predictive frame loss determination component 302, and the bi-predictive frame determination component 304 of FIG. 3, the computer-implemented error recovery system 400, the communications component 402, the downlink 404, the multipoint control unit 406, the multiple endpoints 408, the frame caching component 410, the key frame 412, and the packet loss report 414 of FIG. 4.

The aforementioned application programs 1022, program modules 1024, and program data 1026 can further include the time interval cache 500 and the key frame interval cache 502 of FIG. 5, the reporting components 600 and the packet loss reports 602 of FIG. 6, the process flow 700, the AVMCU 702, the downlink 704, the SP-frame 706, the packet loss report 708, and the subsequent SP-frame 710 of FIG. 7, the process flow 800, the AVMCU 802, the downlink 804, the SP-frame 806, the packet loss report 808, and the subsequent SP-frame 810 of FIG. 8, the process flow 900, the AVMCU 902, the downlink 904, the SP-frame 906, the packet loss report 908, the subsequent SP-frame 910 of FIG. 9, and the methods of FIGS. 10-12, for example.

The storage subsystem(s) 1314 and memory subsystems (1306 and 1318) serve as computer readable media for volatile and non-volatile storage of data, data structures, computer-executable instructions, and so forth. Computer readable media can be any available media that can be accessed by the computer 1302 and includes volatile and non-volatile media, removable and non-removable media. For the computer 1302, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1302, programs, and data using external user input devices 1328 such as a keyboard and a mouse. Other external user input devices 1328 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1302, programs, and data using onboard user input devices 1330 such a touchpad, microphone, keyboard, etc., where the computer 1302 is a portable computer, for example. These and other input devices are connected to the processing unit(s) 1304 through input/output (I/O) device interface(s) 1332 via the system bus 1308, but can be connected by other interfaces such as a parallel port, IEEE 1394 serial port, a game port, a USB port, an IR interface, etc. The I/O device interface(s) 1332 also facilitate the use of output peripherals 1334 such as printers, audio devices, camera devices, and so on, such as a sound card and/or onboard audio processing capability.

One or more graphics interface(s) 1336 (also commonly referred to as a graphics processing unit (GPU)) provide graphics and video signals between the computer 1302 and external display(s) 1338 (e.g., LCD, plasma) and/or onboard displays 1340 (e.g., for portable computer). The graphics interface(s) 1336 can also be manufactured as part of the computer system board.

The computer 1302 can operate in a networked environment (e.g., IP) using logical connections via a wire/wireless communications subsystem 1342 to one or more networks and/or other computers. The other computers can include workstations, servers, routers, personal computers, microprocessor-based entertainment appliance, a peer device or other common network node, and typically include many or all of the elements described relative to the computer 1302. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1302 connects to the network via a wire/wireless communication subsystem 1342 (e.g., a network interface adapter, onboard transceiver subsystem, etc.) to communicate with wire/wireless networks, wire/wireless printers, wire/wireless input devices 1344, and so on. The computer 1302 can include a modem or has other means for establishing communications over the network. In a networked environment, programs and data relative to the computer 1302 can be stored in the remote memory/storage device, as is associated with a distributed system. It will be appreciated that the network connections shown are exemplary and other means of establishing a communications link between the computers can be used.

The computer 1302 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 14:
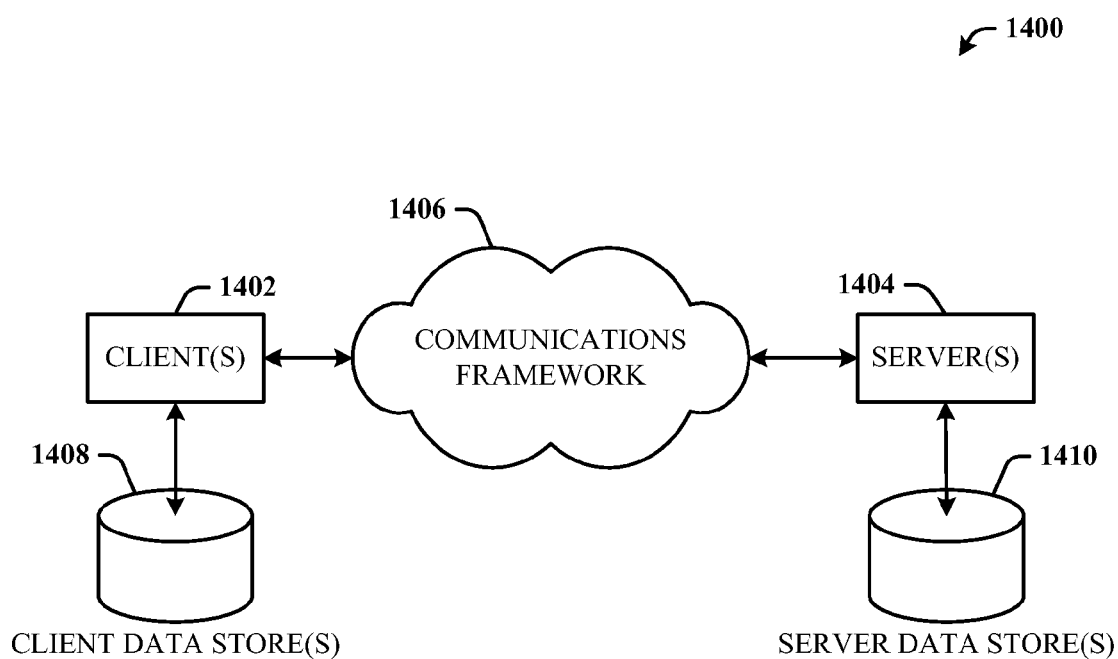
FIG. 14 illustrates an exemplary computing environment operable to provide error recovery.

Referring now to FIG. 14, there is illustrated a schematic block diagram of a computing environment 1400 that can be used for error recovery. The environment 1400 includes one or more client(s) 1402. The client(s) 1402 can be hardware and/or software (e.g., threads, processes, computing devices). The client(s) 1402 can house cookie(s) and/or associated contextual information, for example.

The environment 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The environment 1400 includes a communication framework 1406 (e.g., a global communication network such as the Internet) that can be employed to facilitate communications between the client(s) 1402 and the server(s) 1404.

Communications can be facilitated via a wire (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented error recovery system, comprising:
    a communications component for sending a downlink of dependency-structured compressed signals to an endpoint;
    a frame caching component for caching a key frame of the downlink and resending the key frame in response to a key frame loss indicated in a packet loss report received from the endpoint;
    a key frame loss determination component for resending the key frame and terminating non-key frame delivery in response to a key frame loss indicated in the packet loss report;
    a predictive frame loss determination component for terminating frame delivery until sending a following sequential key frame in response to a predictive frame loss indicated in the packet loss report;
    a bi-predictive frame determination component for preventing resending in response to a bi-predictive frame loss indicated in the packet loss report;
    a redundancy component for optionally controlling redundancy associated with a key frame resent to a requesting endpoint using forward error correction; and
    a processor that executes computer-executable instructions associated with at least the frame caching component, the key frame loss determination component, the predictive frame loss determination component, the bi-predictive frame loss determination component, or the redundancy component.

2. The system of claim 1, further comprising a multipoint control component for determining whether to resend the key frame to a requesting endpoint.

3. The system of claim 1, wherein the key frame loss is indicated for at least one of multiple endpoints, and the frame caching component resends the key frame to the respective at least one of the multiple endpoints.

4. The system of claim 1, wherein the key frame comprises one of an intra-coded frame or a super-predictive frame.

5. A computer-implemented error recovery system, comprising:
    a communications component for sending a downlink of dependency-structured compressed video signals;
    a multipoint control component located between the communications component and multiple endpoints, for distributing the downlink to the multiple endpoints;
    a frame caching component located on the multipoint control component for caching a key frame of the downlink and resending the key frame to at least one of the multiple endpoints in response to a key frame loss indicated in a packet loss report received from the respective at least one of the multiple endpoints;
    a predictive frame loss determination component for terminating frame delivery until sending a following sequential key frame in response to a predictive frame loss indicated in the packet loss report;
    a bi-predictive frame determination component for preventing resending in response to a bi-predictive frame loss indicated in the packet loss report;
    a reporting component associated with each of the multiple endpoints for sending respective packet loss reports to the frame caching component, for indicating key frame loss, predictive frame loss, or bi-predictive frame loss; and
    a processor that executes computer-executable instructions associated with at least the frame caching component.

6. The system of claim 5, further comprising a time interval cache for retaining a time interval of frames between sequential key frames.

7. The system of claim 5, further comprising a key frame interval cache for retaining a key frame and subsequent frames prior to a following sequential key frame.

8. A computer-implemented method of error recovery, comprising acts of:
    storing to a cache at least one frame from a downlink of dependency-structured compressed signals to an endpoint;
    receiving from the endpoint an indication of a lost frame;
    resending the lost frame from the cache to the endpoint in response to an indication that the lost frame is a key frame;

terminating frame delivery until sending a following sequential key frame in response to the indication that the lost frame is a predictive frame;
resending the lost frame and subsequent frames in response to the indication that the lost frame is a key frame;
terminating sending of the subsequent frames when sending a following sequential key frame to the endpoint;
preventing resending in response to the indication that the lost frame is a bi-predictive frame; and
utilizing a processor that executes instructions stored in memory to perform at least one of the acts of storing, receiving, resending, or preventing.

9. The method of claim 8, further comprising sending the downlink to multiple endpoints that each indicates respective lost frames, and resending respective key frames to respective multiple endpoints.

10. The method of claim 8, wherein the dependency-structured compressed signals further comprise at least one of audio signals or video signals.

11. The method of claim 8, further comprising resending the key frame and terminating non-key frame delivery in response to the indication that the lost frame is a key frame.

* * * * *